March 1, 1927.
G. F. HONOLD
1,619,024
WHEEL AND CRANK
Filed April 30, 1926
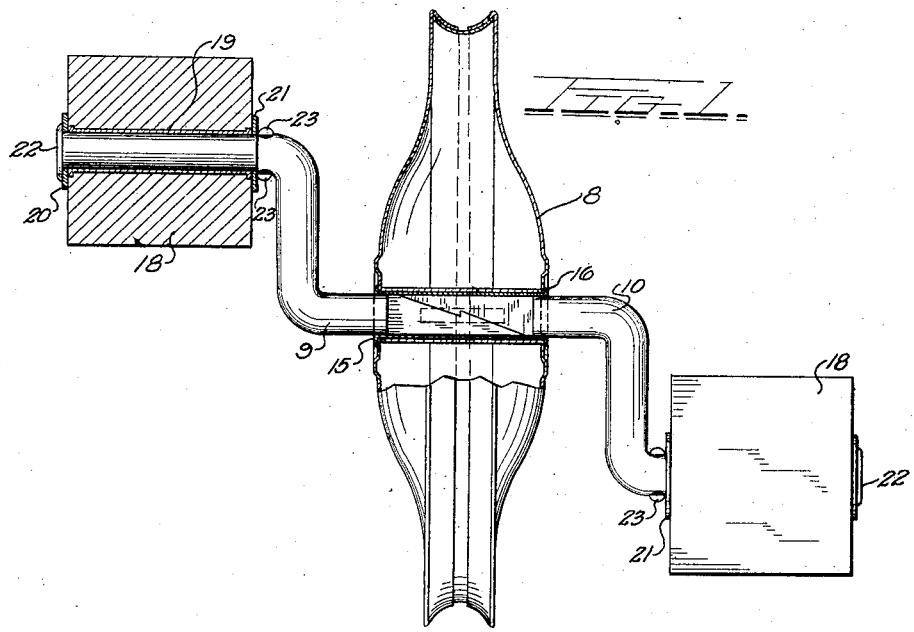
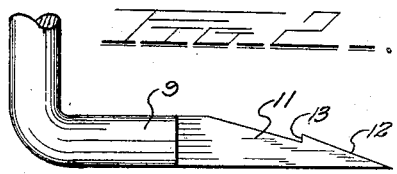
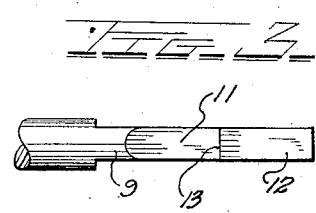
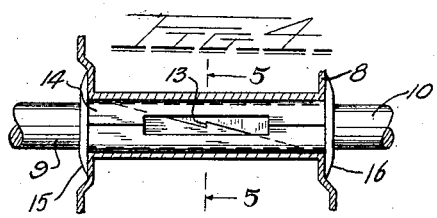
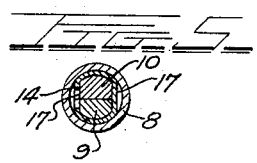
INVENTOR.
Gottlob F. Honold
BY
Morsell, Keeney & Morsell
ATTORNEYS Patented Mar. 1, 1927.

1,619,024

UNITED STATES PATENT OFFICE.

GOTTLOB F. HONOLD, OF SHEBOYGAN, WISCONSIN, ASSIGNOR TO THE GLOBE COMPANY, A CORPORATION OF WISCONSIN.

WHEEL AND CRANK.

Application filed April 30, 1926. Serial No. 105,787.

This invention relates to improvements in wheels and cranks, particularly adapted for use on children's vehicles.

It is one of the objects of the present invention to provide a crank and wheel for children's vehicles in which the crank is formed of two parts adapted for non-separable engagement within the hub portion of the wheel, whereby the crank is held in position without the use of bolts, rivets, or the like.

A further object of the invention is to provide a crank and wheel of a separable or sectional character and constructed so that the assembly of the wheel and crank is accomplished by a force fit of the parts whereby time and materials are saved.

A further object of the invention is to provide a wheel and crank which can be very easily and quickly assembled, saving time and expense, and when assembled is very secure and rigid.

A further object of the invention is to provide a wheel and crank for children's wheeled vehicles which can be packed and shipped in a knock-down condition and readily and quickly assembled by the user.

A further object of the invention is to provide a crank and wheel which are of very simple construction, are strong and durable, are inexpensive to manufacture, and are well adapted for the purposes described.

With the above and other objects in view the invention consists of the improved crank and wheel, and their parts and combinations as set forth in the claims and all equivalents thereof.

In the accompanying drawing in which the same reference characters indicate the same parts in all of the views:

Fig. 1 is a front view of the improved crank and wheel, parts being broken away and shown in section;

Fig. 2 is a fragmentary side view of a crank section;

Fig. 3 is a plan view of the same;

Fig. 4 is a view illustrating the connection of the crank sections, part being shown in section; and Fig. 5 is a cross-sectional view taken on line 5—5 of Fig. 4.

Referring now more particularly to the drawing it will appear that the numeral 8 indicates a metal wheel, such as is used on children's vehicles and said wheel is formed with a central transverse opening to receive a crank.

The crank is formed in two complementary sections 9 and 10, angular in shape as shown in Fig. 1 and the adjacent end portions of the crank sections are formed with pairs of inclined surfaces 11 and 12, interrupted by shoulders 13.

In the assembly of the crank sections and wheel a split tube 14 is inserted in the transverse opening of the wheel and the two crank sections are next inserted thereinto from opposite ends. Inasmuch as the metallic tube 14 is split, it will yield sufficiently to allow the crank sections to be pushed together until the shoulders 13 thereof engage and snap the sections into normal position, engaging each other, as shown in Figs. 1 and 4. The tube and parts are next locked in position by hammering the ends of the tube back, as at 15 and 16 in Fig. 1. As shown in Fig. 5 the sides of the crank sections are flattened, as at 17, to prevent the crank from turning within the wheel, whereby turning of the crank will turn the wheel.

The outer end portions of the crank sections have pedals 18 revolubly mounted thereon. Between the pedals and the crank are sleeves 19 and the pedals are held against lateral displacement by washers 20 and 21, the washers 20 being interposed between the pedals and the riveted ends 22 of the crank, and the washers 21 being between the other ends of the pedals and ears 23 formed on the crank.

From the foregoing description it will be seen that the improved crank and wheel provides for the easy assembly of the parts, and are of very simple and novel construction.

What I claim as my invention is:

1. In combination, a wheel having a transverse opening, a pair of crank sections entering said opening and having a shouldered and notched engagement with each other, and a yielding sleeve member within said opening and enclosing the crank section portions therewithin.

2. In combination, a wheel having a transverse opening, a pair of crank sections entering said opening and having a shouldered and notched engagement with each other, and a yielding split sleeve member within said opening and enclosing said crank section portions therewithin and holding the same against separation.

3. In combination, a wheel having a transverse central opening, a pair of complementary crank members formed with tapered and shouldered end portions wedgingly engaging each other within said central opening, the adjacent end portions of said crank members being squared to prevent turning, and a split sleeve member within said opening and enclosing the engaging portions of said crank members, the outer end portions of said sleeve being bent against the surfaces of the wheel.

4. A sectional crank for wheeled vehicles, comprising a pair of complementary crank members, each having tapered and shouldered inner end portions, and a split tubular member yieldingly surrounding the inner end portions of the crank members and holding the same in engagement.

In testimony whereof, I affix my signature.

GOTTLOB F. HONOLD.